(12) United States Patent
Park et al.

(10) Patent No.: US 7,364,497 B2
(45) Date of Patent: Apr. 29, 2008

(54) POLISH PAD AND CHEMICAL MECHANICAL POLISHING APPARATUS COMPRISING THE SAME

(75) Inventors: Moo-yong Park, Yongin-si (KR); Tae-hoon Lee, Suwon-si (KR); Jae-eung Koo, Goyang-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/169,731

(22) Filed: Jun. 30, 2005

(65) Prior Publication Data

US 2006/0003677 A1   Jan. 5, 2006

(30) Foreign Application Priority Data

Jul. 1, 2004   (KR) ............... 10-2004-0051129

(51) Int. Cl.
*B24B 5/00* (2006.01)
*B24B 29/00* (2006.01)

(52) U.S. Cl. ............... 451/285; 451/286; 451/287; 451/288; 451/289; 451/290; 451/527; 451/533; 451/548

(58) Field of Classification Search ........ 451/285–289, 451/290, 446, 527, 528, 533, 534, 548, 550
See application file for complete search history.

(56) References Cited

U.S. PATENT DOCUMENTS 4,037,367 A * 7/1977 Kruse ..................... 451/551

| | | | | |
|---|---|---|---|---|
| 6,346,032 B1 * | 2/2002 | Zhang et al. | ........... | 451/41 |
| 6,758,723 B2 * | 7/2004 | Kobayashi et al. | ........... | 451/6 |
| 6,918,824 B2 * | 7/2005 | Marquardt et al. | ......... | 451/285 |
| 2002/0187735 A1 * | 12/2002 | Nabeya | ................. | 451/67 |
| 2004/0033759 A1 * | 2/2004 | Schultz et al. | ................ | 451/6 |
| 2004/0242121 A1 * | 12/2004 | Hirokawa et al. | ............. | 451/5 |

FOREIGN PATENT DOCUMENTS

| | | |
|---|---|---|
| JP | 10-277921 | 10/1998 |
| JP | 2000-755 | 1/2000 |
| JP | 2000-33553 | 2/2000 |
| KR | 2003-0015568 | 2/2003 |

* cited by examiner

*Primary Examiner*—Joseph J. Hail, III
*Assistant Examiner*—Robert Scruggs
(74) *Attorney, Agent, or Firm*—Volentine & Whitt, PLLC

(57) ABSTRACT

A polishing pad for use in chemically mechanically polishing a semiconductor substrate enhances the uniformity of the rate at which material is removed from the surface of the semiconductor substrate, thereby ensuring the reproducibility of the chemical mechanical polishing process. The polishing pad has main grooves that divide an upper portion of the pad into a plurality of cells. At least one of the cells includes a land portion and a grooved portion substantially enclosed by the land portion. A respective slurry hole extends through the pad to the grooved portion such that slurry supplied through the slurry hole feeds into the grooved portion but is impeded by the land portion from flowing outwardly of the cell.

16 Claims, 4 Drawing Sheets

POLISH PAD AND CHEMICAL MECHANICAL POLISHING APPARATUS COMPRISING THE SAME

BACKGROUND OF THE INVENTION

1. Field of the Invention

The present invention relates to a chemical mechanical polishing (CMP) apparatus for polishing a semiconductor substrate. More specifically, the present invention relates to a polishing pad of the of the CMP apparatus.

2. Description of the Related Art

Recently, the rapid development of data processing and communications technologies has led to the demand for semiconductor devices, such as Dynamic Random Access Memories (DRAMs), that operate rapidly and have large storage capacities. Accordingly, semiconductor device fabrication technology has been developed with the aim of enhancing the integration, reliability, and response speed of semiconductor devices.

Fabricating semiconductor devices that have higher degrees of integration, are more miniaturized, and have large numbers of metal-bearing layers creates larger and larger steps on the surface of the substrates on which the semiconductor devices are formed. Techniques for planarizing the stepped surface of a semiconductor substrate include SOG (Spin On Glass), etch back, and reflow processes. However, chemical mechanical polishing (CMP) has been widely used for globally planarizing a semiconductor substrate surface. Chemical mechanical polishing is carried out by a CMP apparatus using a polishing pad.

FIG. 1 illustrates a conventional polishing pad of a CMP apparatus. Referring to FIG. 1, an upper surface of the conventional polishing pad is formed with grooves 1 and slurry holes 3. A polishing slurry is supplied onto an object to be polished (e.g., a semiconductor substrate) via the slurry holes 3. The slurry is dispersed via the grooves 1. In addition, the polishing pad is rotated during the CMP process. Thus, the slurry is spun off of the peripheral edge of the polishing pad due to the centrifugal force caused by the rotation of the polishing pad during the CMP process. For this reason, the slurry is distributed non-uniformly across the surface of the polishing pad.

Such non-uniform slurry distribution causes variations in the rate at which material is removed across the surface of the semiconductor substrate. In particular, the rate at which material is removed by the polishing process at the center of the semiconductor substrate is remarkably different from the rate at which material is removed at the periphery of the semiconductor substrate. The planarity of the semiconductor substrate depends on the uniformity of the removal rate. Thus, the conventional polishing pad makes it difficult to planarize a semiconductor substrate sufficiently and to effect a CMP process that is reproducible.

SUMMARY OF THE INVENTION

An object of the present invention is to provide a polishing pad of a chemical mechanical polishing (CMP) apparatus that enhances the uniformity of the rate at which material is removed from a substrate being polished, thereby ensuring the reproducibility of the CMP process.

According to one aspect of the present invention, there is provided a polishing pad for use in chemical mechanical polishing, the polishing pad having an upper surface, main grooves extending in the upper surface and separating an upper portion of the pad into a plurality of cells, and wherein at least one of the cells consists of a land portion and a grooved portion. The grooved portion is substantially enclosed by the land portion and is defined by at least one groove extending in the upper surface of the pad within the cell.

A respective slurry hole extends through the pad to the grooved portion of the cell(s). Thus, slurry supplied through the slurry hole towards the upper surface of the pad will feed into the at least one groove and will be impeded by the land portion from spreading outwardly of the cell.

According to another aspect of the present invention, there is provided a polishing pad for use in chemical mechanical polishing, the polishing pad having an upper surface, main grooves extending in the upper surface and separating an upper portion of the pad into a plurality of cells, and wherein at least one of the cells consists of a land portion, and a grooved portion defined by at least a first major groove and at least one minor groove extending in the upper surface of the pad.

A respective slurry hole extends through the pad to the first major groove. Each one minor groove has a closed geometric shape and is connected to the first major groove. Thus, slurry supplied through the slurry hole towards the upper surface of the pad will be fed to the minor groove via the first major groove. Also, the cross-sectional area of each minor groove is smaller than that of the first major groove to thereby regulate the flow of the slurry from the first major groove.

According to still another aspect of the present invention, there is provided a chemical mechanical polishing apparatus including a polishing pad having one or more of the features described above.

BRIEF DESCRIPTION OF THE DRAWINGS

The above and other objects, features and advantages of the present invention will become more apparent from the following detailed description of the preferred embodiments thereof made with reference to the attached drawings in which.

DETAILED DESCRIPTION OF THE PREFERRED EMBODIMENTS

Figure 1:
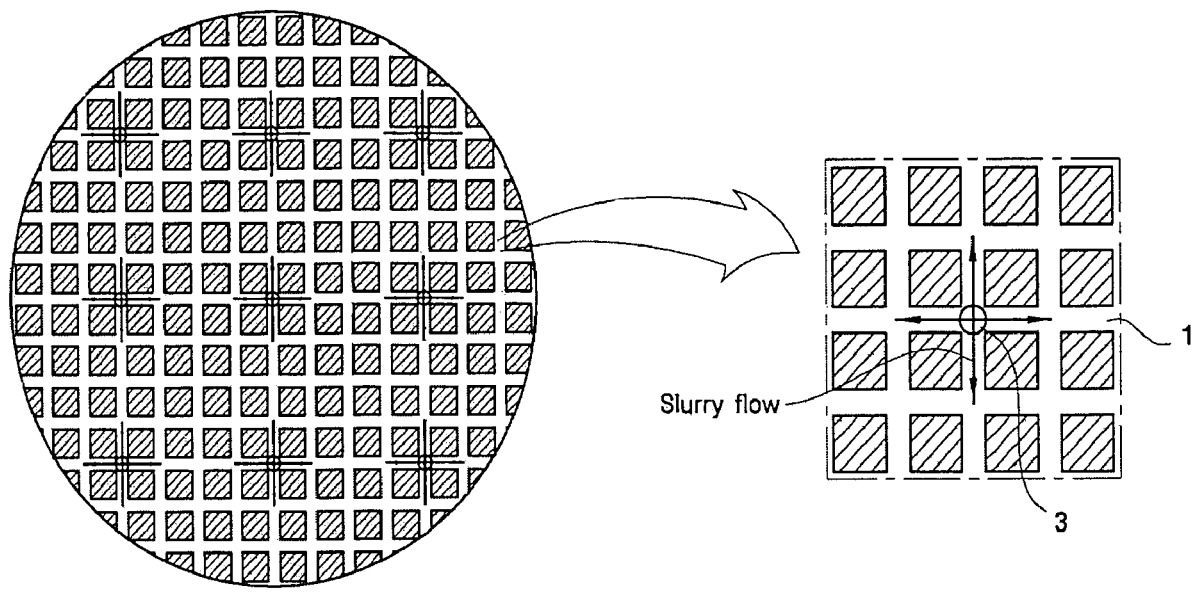
FIG. 1 is a plan view of a conventional polishing pad for use in the chemical mechanical polishing (CMP) of a semiconductor substrate.
Figure 2:
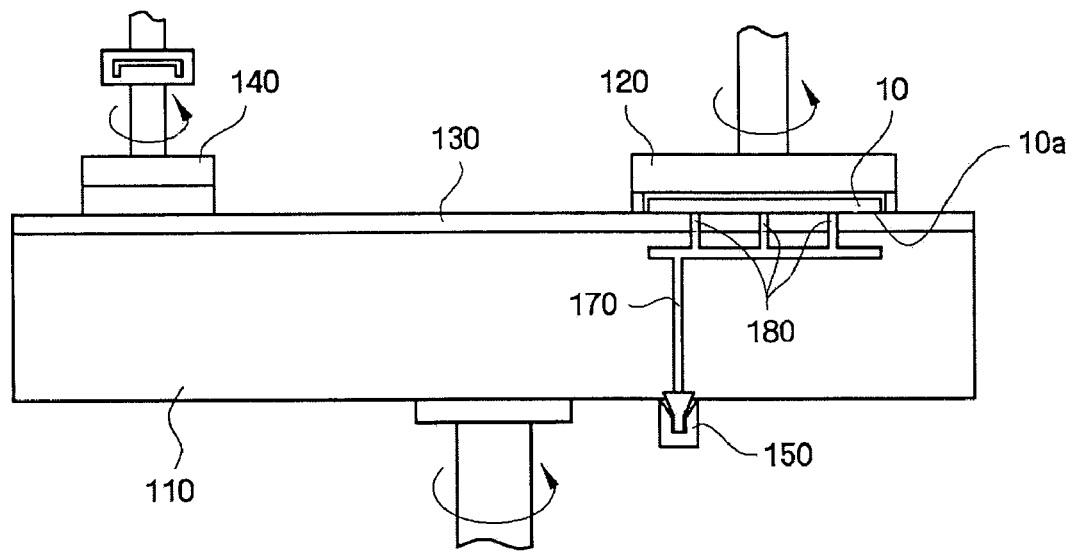
FIG. 2 is a schematic diagram of a CMP apparatus for polishing a semiconductor substrate using a polishing pad according to the present invention.

A chemical mechanical polishing (CMP) apparatus for polishing a semiconductor substrate using a polishing pad according to the present invention will now be described with reference to FIG. 2.

The CMP apparatus includes a platen 110, a polishing pad 130, a pad conditioner 140, a polishing head 120, and a slurry supply unit 150. The polishing pad 130 is attached to the platen 110. The slurry supply unit 150 supplies slurry onto the polishing pad 130 through a slurry flow passageway 170. In particular, the slurry is fed to a system 180 of slurry holes in the polishing pad 130 via the slurry flow passageway 170. The polishing head 120 forces a surface 10a of the semiconductor substrate 10 against the polishing pad 130 during a CMP process. In this state, the platen 110 and the polishing head 120 are rotated, and the slurry fed onto the polishing pad 130 polishes the surface 10a of the semiconductor substrate 10. Also, during this time, the pad conditioner 140 scores the surface of the polishing pad 130 to maintain the condition of the surface presented by the polishing pad 130 to the substrate being polished. Therefore, the rate at which the CMP process polishes the substrate can remain constant.

Figure 3:
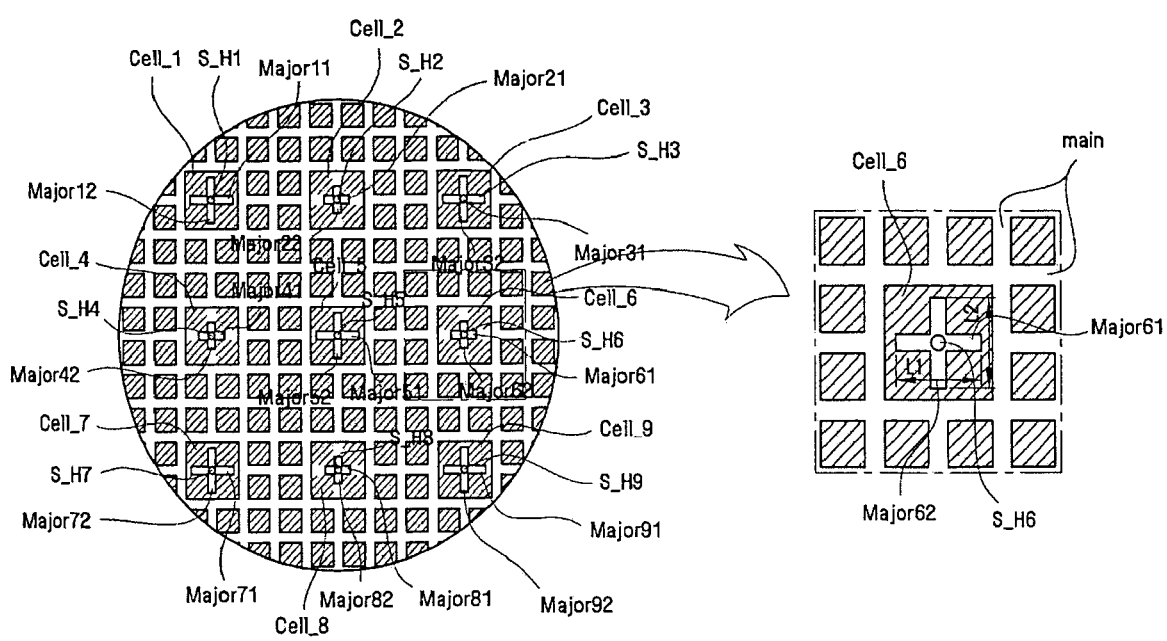
FIG. 3 is a plan view of a first embodiment of a polishing pad of the CMP apparatus according to the present invention.

A first embodiment of the polishing pad of the CMP apparatus according to the present invention will now be described with reference to FIG. 3.

The polishing pad has an upper portion divided into a plurality of cells Cell_1 through Cell_9 by main grooves. The cells Cell_1 through Cell_9 are square and are delimited by the main grooves which are thus seen to extend along the periphery of the cells Cell_1 through Cell_9. The cells Cell_1 through Cell_9 consist of land portions, and grooved portions defined by first major grooves Major11 through Major91, respectively. In addition, a system slurry holes S_H1 through S_H9 extend through the body of the pad, and one or more slurry holes S_H1 through S_H9 are open to the first major grooves Major11 through Major91. Slurry for polishing the target surface of an object (e.g., a semiconductor substrate) is supplied to the slurry holes S_H1 through S_H9 via a passageway in the platen of the CMP apparatus (170 in FIG. 2).

The first major grooves Major11 through Major91 extend within the upper surface of the pad within the cells Cell_1 through Cell_9, respectively, but are not contiguous with the main grooves. However, each of the first major grooves Major11 through Major91 intersects a slurry hole S_H1 through S_H9 within the respective cell Cell_1 through Cell_9 so that slurry supplied through the slurry holes S_H1 through S_H9 is fed to the first major grooves Major11 through Major91. Accordingly, the slurry flows outward along the first major grooves Major11 through Major91 as the polishing pad is rotated.

According to the present invention as described above, slurry supplied to the upper surface of the polishing pad via the slurry holes S_H1 through S_H9 flows along the first major grooves Major11 through Major91 but is impeded by the land portions of the cells Cell_1 through Cell_9 from flowing radially outward off of the polishing pad when the polishing pad is rotated. Furthermore, the amount of the slurry that does manage to flow outward from the cells Cell_1 through Cell_9 is uniform regardless of the positions of the cells Cell_1 through Cell_9 because the first major grooves Major11 through Major91 are not connected to the main grooves. That is, the polishing pad according to the present invention distributes slurry uniformly across the pad. Therefore, the rate at which material is removed from the target layer of the object by the CMP process is uniform, thereby ensuring the reproducibility of the CMP process.

Preferably, the first major grooves Major11 through Major91 are disposed symmetrically with respect to the slurry holes S_H1 through S_H9, respectively. Therefore, a uniform distribution of the slurry is ensured. Also, the first major grooves Major11 through Major91 need not necessarily all have the same length L1. More specifically, the lengths of at least some of the first major grooves Major11 through Major91 may vary according to the type of process, e.g., a Damascene process or a Shallow Trench Isolation process, that is being carried out on the substrate. The greater the length L1 of the first major grooves Major11 through Major91, the greater is the amount of slurry that flows through the first major grooves Major11 through Major91.

The first embodiment of the polishing pad according to the present invention may further include second major grooves Major12 through Major92 in the cells Cell_1 through Cell_9. The second major grooves Major12 through Major92 are also not contiguous with the main grooves but may cross the first major grooves Major11 through Major91, respectively, at locations where the first major grooves Major11 through Major91 intersect the slurry holes S_H1 through S_H9. Preferably, the second major grooves Major12 through Major92 extend perpendicular to the first major grooves Major11 through Major91.

Therefore, when the polishing pad is rotated after the slurry has been supplied through the slurry holes S_H1 through S_H9, the slurry spreads through the first major grooves Major11 through Major91 and the second major grooves Major12 through Major92. However, the outward flow of slurry is impeded by the cells Cell_1 through Cell_9 to suppress the rate at which the slurry is spun off of the polishing pad by centrifugal force. Furthermore, the amount of the slurry that does manage to flow outward from the cells Cell_1 through Cell_9 is uniform regardless of the positions of the cells Cell_1 through Cell_9 because neither the second major grooves Major12 through Major92 nor the first major grooves Major11 through Major91 are connected to the main grooves.

Preferably, the second major grooves Major12 through Major92 are also disposed symmetrically with respect to the slurry holes S_H1 through S_H9. Therefore, like the first major grooves Major11 through Major91, the second major grooves Major12 through Major92 facilitate a uniform distribution of the slurry. Furthermore, the second major grooves Major12 through Major92 need not necessarily all have the same length L2. For instance, the lengths L2 of at least some of the second major grooves Major12 through Major92 may vary according to the type of process, e.g., a Damascene process or a Shallow Trench Isolation process, that is being carried out on the substrate. As with the first major grooves Major11 through Major91, the greater the length L2 of the second major grooves Major12 through Major92, the greater is the amount of slurry that flows through the second major grooves Major12 through Major92.

Figure 4:
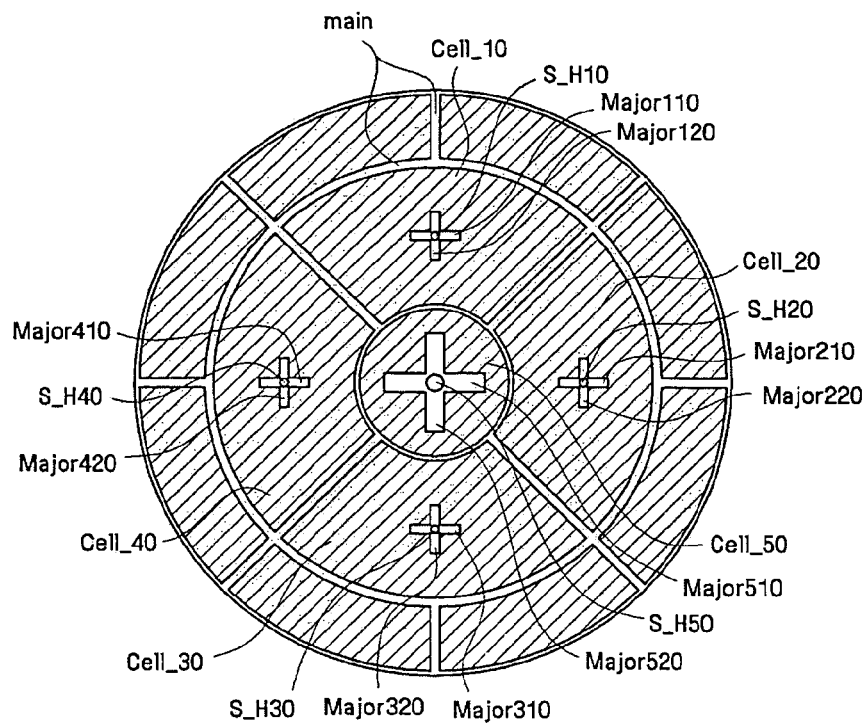
FIG. 4 is a plan view of a modified form of the first embodiment of the polishing pad according to the present invention.

A modified form of the first embodiment of the polishing pad according to the present invention will now be described with reference to FIG. 4.

This polishing pad has a plurality of cells Cell_10 through Cell_50 whose shapes are delimited by concentric circles. More specifically, the Cell_50 at the center of the polishing pad is circular, and the other cells Cell_10 through Cell_40 each have the shape of a segment of a ring extending around the central Cell_50. Thus, in this case, the radially inner and outer peripheries of the cells Cell_10 through Cell_40 lie along circles concentric with Cell_50. However, the central cell may have other closed shapes. For example, the central cell may be oblong or pentagonal.

Figure 5:
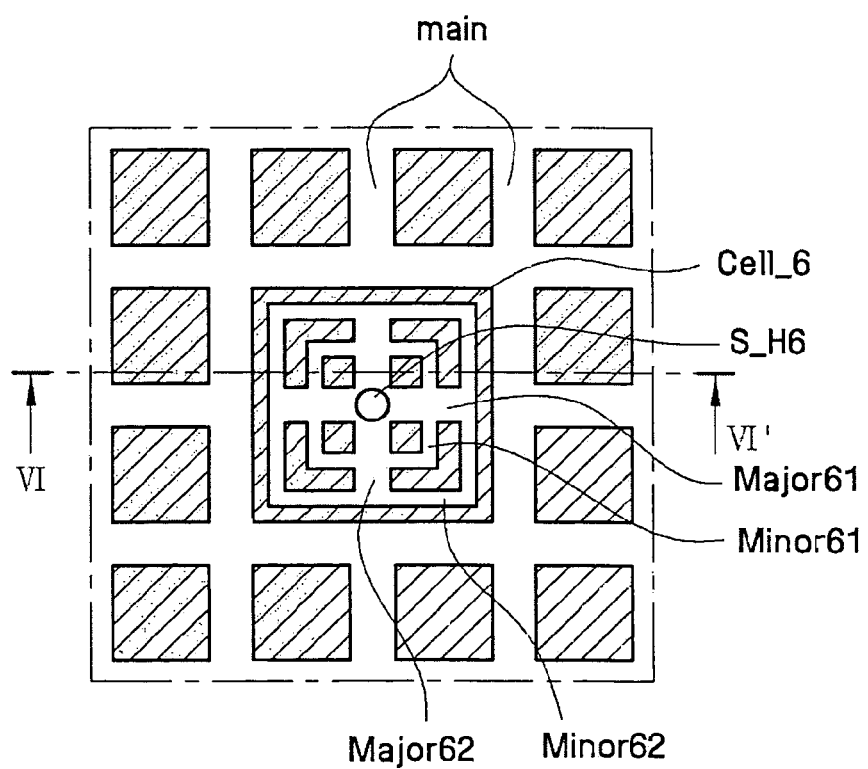
FIG. 5 is a plan view of a second embodiment of a polishing pad of CMP apparatus according to the present invention.

A second embodiment of a polishing pad according to the present invention will now be described with reference to FIGS. 5 and 6.

The second embodiment of the polishing pad has a plurality of cells delimited by main grooves, and in this case, the grooved portion of a respective cell is defined by major and minor grooves. In addition, slurry holes extend through the body of the pad and are open to the major grooves within the cells, respectively. Even though this embodiment of the polishing pad may include nine cells arranged similarly to that shown in FIG. 3, only a sixth cell Cell_6 is illustrated in FIGS. 5 and 6 for the sake of simplicity. All of the cells have a structure similar to that of the sixth cell Cell_6 and therefore, only the structure of the polishing pad associated with this Cell_6 will be described in detail.

The cell Cell_6 is square. Main grooves extend within the upper surface of the pad to delimit the cell. Thus, main grooves are seen to extend along the periphery of the cell Cell_6. A slurry hole S_H6 opens at the upper surface of the pad within the cell Cell_6. Slurry for polishing a target surface of an object (e.g., a semiconductor substrate) is supplied to the slurry hole S_H6 via a passageway in the platen of the CMP apparatus (170 in FIG. 2).

A first major groove Major61 extends entirely within the cell Cell_6 and is not contiguous with the main grooves. The first major groove Major61 also intersects the slurry hole S_H6 so that slurry supplied through the slurry hole S_H6 is fed to the first major groove Major61. Similarly, a second major groove Major62 may extend entirely within the cell Cell_6 so as to not be contiguous with the main grooves. The second major groove Major62 crosses the first major groove Major61 at the location at which the first major groove Major61 intersects the slurry hole S_H6 so that slurry supplied through the slurry hole S_H6 is also fed to the second major groove Major62.

In addition, first and second minor grooves Minor61 and Minor62 extend entirely within the cell Cell_6, do not overlap each other, and are not contiguous with the main grooves. Each of the minor grooves Minor61 and Minor62 has a closed geometric shape; however, the shape does not have to be square. For example, the first and second minor grooves Minor61 and Minor62 may each be oblong or circular. Furthermore, the first and second minor grooves Minor61 and Minor62 extend across the first major groove Major61 (and second major groove Major62). Thus, the slurry supplied through the slurry hole S_H6 is fed to the first and second minor grooves Minor61 and Minor62. Accordingly, the slurry flows outward from the first major groove Major61, the second major groove Major62 and the first and second minor grooves Minor61 and Minor62 as the polishing pad is rotated.

Preferably, each of the first and second minor grooves Minor61 and Minor62 is disposed symmetrically with respect to the first major groove Major61 (and second major groove Major62). Also, the polishing pad may have a slurry hole(s) that opens into the first or second minor groove Minor61 or Minor62. Therefore, a uniform distribution of the slurry throughout the cell Cell_6 and hence, across the pad, is ensured. Furthermore, although only two minor grooves Minor61 and Minor62 are shown and described, each cell may have a greater number of minor grooves extending therein to further enhance the ability of the pad to suppress the flow of slurry radially outwardly off of the polishing pad when the pad is rotated.

Figure 6:
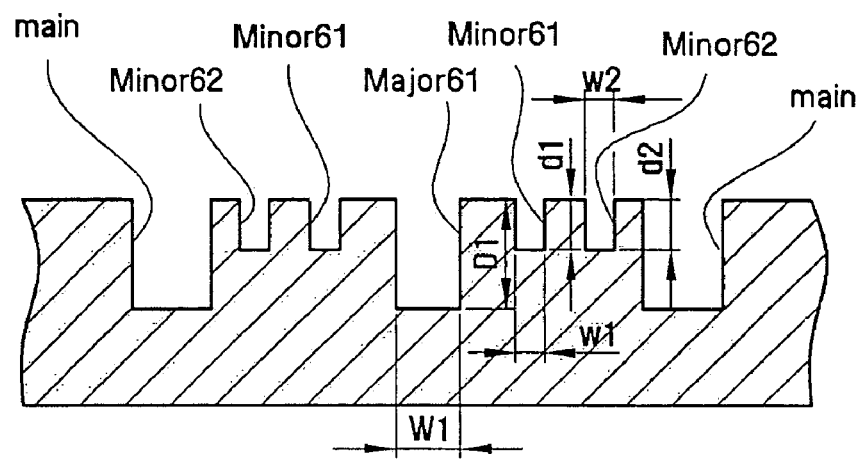
FIG. 6 is a sectional view taken along line VI-VI' of FIG. 5.

Referring to FIG. 6, preferably, the widths w1 and w2 of the first and second minor grooves Minor61 and Minor62 are each smaller than the width W1 of the first major groove Major61. The ratios (w1/W1 and w2/W1) of the widths of the first and second minor grooves Minor61 and Minor62 to the width first major groove Major61 are in the range of 0.1 to 1. Similarly, the depths d1 and d2 of the first and second minor grooves Minor61 and Minor62 are each less than the depth D1 of the first major groove Major61. The ratios (d1/D1 and d2/D1) of the depths of the first and second minor grooves Minor61 and Minor62 to the depth of the first major groove Major61 are in the range of 0.1 to 1. That is, the cross-sectional area of each of the first and second minor grooves Minor61 and Minor62 is smaller than the cross-sectional area of the first major groove Major61. Therefore, the provision of the first and second minor grooves Minor61 and Minor62 allows for a minute adjustment in the amount of slurry that flows throughout the cell Cell_6.

As should be clear from the description above, the second embodiment of the polishing pad according to present invention is more effective than the first embodiment in suppressing the flow of slurry radially outward and off of the polishing pad when the polishing pad is rotated because slurry can flow through and accumulate in the first and second minor grooves Minor61 and Minor62 in addition to the major groove(s).

Figure 7:
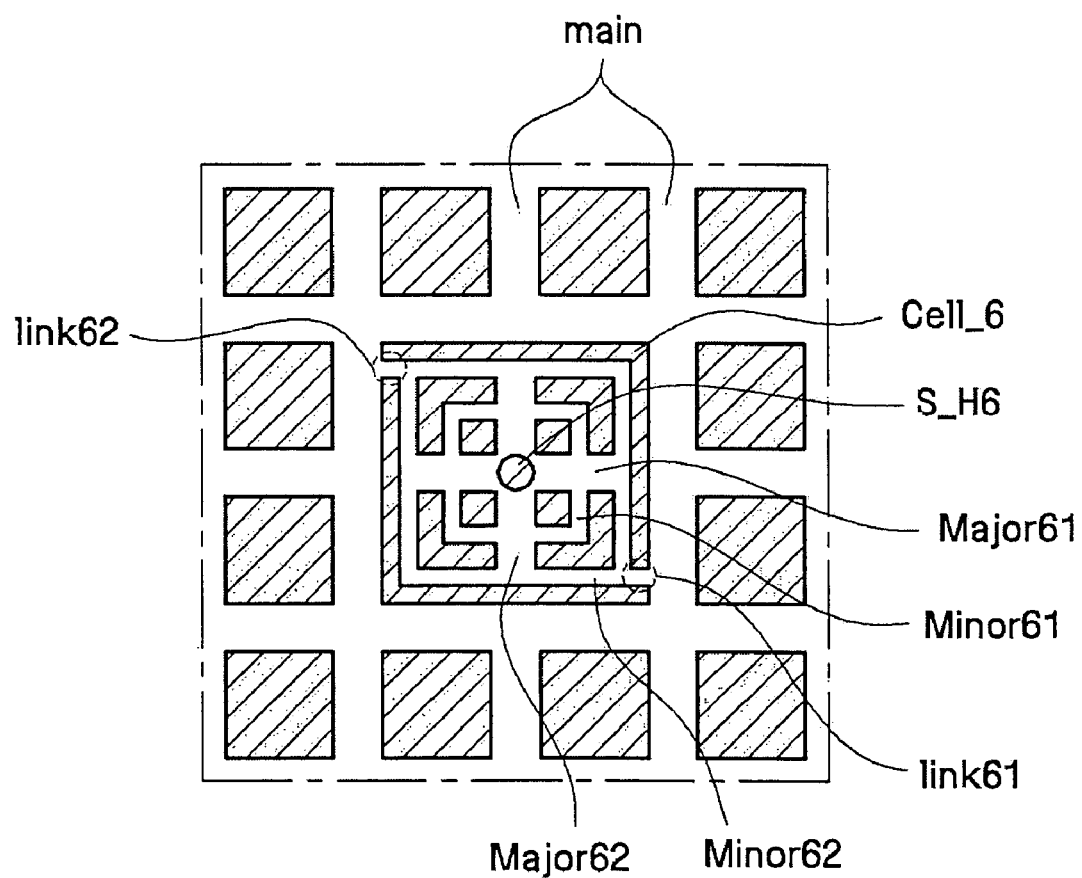
FIG. 7 is a plan view of a third embodiment of a polishing pad of CMP apparatus according to the present invention.

A third embodiment of a polishing pad of a CMP apparatus according to the present invention will now be described with reference to FIG. 7.

The third embodiment of the polishing pad has a plurality of cells, main grooves, and major and minor grooves extending within each of the cells. In addition, slurry holes extend through the body of the pad and are open to the upper surface of the pad within the cells, respectively. Even though this embodiment of the polishing pad may include nine cells arranged similarly to that shown in FIG. 3, only a sixth cell Cell_6 is illustrated in FIG. 7 for the sake of simplicity. All of the other cells have a structure similar to that of the sixth cell Cell_6 and therefore, only the structure of the polishing pad associated with this Cell_6 will be described in detail with reference to FIG. 7. Moreover, the third embodiment of the polishing pad is similar to that of the second embodiment of FIGS. 5 and 6 and thus, only that portion of the third embodiment which differs from the second embodiment will be described in detail below.

The third embodiment of the polishing pad includes at least one link groove link61 and link62 extending between and connecting the main grooves to the first and second minor grooves Minor61 and Minor62. Therefore, slurry fed to the first and second minor grooves Minor61 and Minor62 flows through the link groove(s). The link groove(s) serve as a control on the amount of residual slurry in the cell, i.e., the amount of slurry that remains in the first or second minor groove Minor61 or Minor62 after the CMP process.

As is apparent from the description above, a polishing pad for use in chemically mechanically polishing a semiconductor substrate according to the present invention enhances the uniformity of the rate at which material is removed from the semiconductor substrate, thereby making the CMP reproducible.

Finally, although the present invention has been particularly shown and described with reference to the preferred embodiments thereof, it will be understood that various changes in form and details may be made thereto without departing from the spirit and scope of the present invention as defined by the following claims.

What is claimed is:

1. A polishing pad for use in chemical mechanical polishing, the polishing pad having a major upper surface, and a major lower surface, main grooves in the major upper surface and separating an upper portion of the pad into a plurality of cells, wherein the main grooves delimit the cells, at least one of the cells consisting of a land portion, and a grooved portion, the grooved portion being substantially enclosed by the land portion and defined by at least one groove in the major upper surface of the pad within the cell, each said at least one groove having a bottom delimited by a surface of the pad which is located intermediate the major upper and lower surfaces of the pad, and a respective slurry hole open to the major lower surface of the pad and extending through the pad to the bottom of the at least one groove defining the grooved portion of each said at least one of the cells, and wherein the at least one groove includes a first major groove intersecting the location to which the respective slurry hole extends in the cell, and a second major groove intersecting the location to which the respective slurry hole extends in the cell, whereby slurry supplied through the slurry hole towards the upper surface of the pad will feed into the major grooves and will be impeded by the land portion from spreading outwardly of the cell.

2. The polishing pad of claim 1, wherein the second major groove extends symmetrically with respect to the slurry hole.

3. The polishing pad of claim 1, wherein the second major groove extends perpendicular to the first major groove.

4. The polishing pad of claim 1, wherein at least two of the cells consist of a respective said land portion and a respective said grooved portion, and the second major grooves extending in the upper surface of the pad within at least two of said cells have the same length.

5. The polishing pad of claim 1, wherein at least two of the cells consist of a respective said land portion and a respective said grooved portion, and the second major grooves extending in the upper surface of the pad within at least two of said cells have different lengths.

6. The polishing pad of claim 1, wherein each said respective slurry supply hole of the polishing pad has a circular cross section.

7. A chemical mechanical polishing apparatus comprising:

a platen having a slurry flow passageway extending therein and open at an upper surface thereof;

a slurry supply unit connected to said slurry flow passageway;

a polishing pad disposed on the upper surface of said platen, said polishing pad having an upper surface, main grooves extending in the upper surface and separating an upper portion of the pad into a plurality of cells, wherein the main grooves delimit the cells, at least one of the cells consisting of a land portion, and a grooved portion, the grooved portion being substantially enclosed by the land portion and defined by at least one groove extending in the upper surface of the pad within the cell, wherein each said at least one groove has a bottom delimited by a surface of the pad which is located intermediate the major upper and lower surfaces of the pad, and a respective slurry hole open to the major lower surface of the pad and extending through the pad to the bottom of the at least one groove defining the grooved portion of each of said at least one of the cells, and each said slurry hole being in fluid communication with the slurry flow passageway of the slurry supply unit, whereby slurry supplied through the slurry hole towards the upper surface of the pad will feed into the at least one groove; and a polishing head disposed above said platen and operative to force a surface of a substrate to be polished against the polishing pad, wherein the at least one groove includes a first major groove intersecting the location to which the respective slurry hole extends in the cell, and a second major groove intersecting the location to which the respective slurry hole extends in the cell.

8. The chemical mechanical polishing apparatus of claim 7, wherein the at least one groove of the polishing pad includes a first major groove intersecting the location to which the respective slurry hole extends in the cell.

9. The chemical mechanical polishing apparatus of claim 8, wherein the first major groove extends symmetrically with respect to the slurry hole.

10. The chemical mechanical polishing apparatus of claim 8, wherein at least two of the cells consist of a respective said land portion and a respective said grooved portion, and the first major grooves extending in the upper surface of the pad within at least two of said cells have the same length.

11. The chemical mechanical polishing apparatus of claim 8, wherein at least two of the cells consist of a respective said land portion and a respective said grooved portion, and the first major grooves extending in the upper surface of the pad within at least two of said cells have different lengths.

12. The chemical mechanical polishing apparatus of claim 7, wherein the second major groove extends symmetrically with respect to the slurry hole.

13. The chemical mechanical polishing apparatus of claim 7, wherein the second major groove extends perpendicular to the first major groove.

14. The chemical mechanical polishing apparatus of claim 7, wherein at least two of the cells consist of a respective said land portion and a respective said grooved portion, and the second major grooves extending in the upper surface of the pad within at least two of said cells have the same length.

15. The polishing pad of claim 7, wherein at least two of the cells consist of a respective said land portion and a respective said grooved portion, and the second major grooves extending in the upper surface of the pad within at least two of said cells have different lengths.

16. The chemical mechanical polishing apparatus of claim 7, wherein each said respective slurry supply hole of the polishing pad has a circular cross section.

* * * * *